United States Patent [19]

Hulderman et al.

[11] Patent Number: 5,029,960
[45] Date of Patent: Jul. 9, 1991

[54] FIBER OPTIC CANISTER WITH COMPLIANT BASELAYER

[75] Inventors: George H. Hulderman; Gary R. Redford; Gregory LoStracco, all of Tucson, Ariz.

[73] Assignee: Hughes Aircraft Company, Los Angeles, Calif.

[21] Appl. No.: 574,577

[22] Filed: Aug. 27, 1990

Related U.S. Application Data

[63] Continuation of Ser. No. 314,349, Feb. 23, 1989, abandoned.

[51] Int. Cl.⁵ .................................................. G02B 6/00
[52] U.S. Cl. ............................... 350/96.10; 242/118.2; 242/159; 350/96.29
[58] Field of Search .............. 350/96.10, 96.23, 96.29, 350/96.22; 242/118.11, 118.2, 172, 174, 159

[56] References Cited

U.S. PATENT DOCUMENTS

| | | | |
|---|---|---|---|
| 4,182,500 | 1/1980 | Schlicker | 242/118.7 |
| 4,696,438 | 9/1987 | Myers | 242/118.41 |
| 4,724,316 | 2/1988 | Morton | 350/96.29 X |
| 4,746,080 | 5/1988 | Pinson | 242/159 X |
| 4,750,804 | 6/1988 | Osaka et al. | 350/96.22 X |
| 4,752,043 | 6/1988 | Heinzer | 242/159 X |
| 4,955,688 | 9/1990 | Chapin et al. | 350/96.29 |
| 4,957,344 | 9/1990 | Chesler et al. | 350/96.23 |

*Primary Examiner*—John D. Lee
*Attorney, Agent, or Firm*—C. D. Brown; R. M. Heald; W. K. Denson-Low

[57] ABSTRACT

A fiber optic cannister includes a compliant baselayer underlying layers of an optical fiber wound onto a bobbin. The compliant material is useful to form a base layer over which the layers of optical fiber are wound. The use of such a compliant baselayer eliminates the need to fabricate and stock expensive baselayer wire material.

3 Claims, 2 Drawing Sheets

FIBER OPTIC CANISTER WITH COMPLIANT BASELAYER

This is a continuation of application Ser. No. 07/314,349, filed Feb. 23, 1989, abandoned.

This invention relates to techniques for winding optical fibers onto bobbins. More particularly, the invention is a compliant material that is used to form a base layer over which optical fibers are wound onto a bobbin with reduced optical losses and at a lower cost.

BACKGROUND OF THE INVENTION

It has become increasingly common to wind long lengths of optical fibers to form wound fiber items. Typically, these optical fibers are wound onto a bobbin over a wire baselayer. The wire base layer is used to set the spacing, winding pitch, and other characteristics of the final wound optical fiber item.

A typical prior art winding system is shown in FIGS. 1A and 1B. As shown in those figures, typically a wound filament item 2 is made by first winding onto a bobbin 4 and a wire baselayer 6. The optical fiber 8 is then wound over the wire baselayer 6 until a first optical fiber layer 10 is formed. Winding of the optical fiber is then continued until a plurality of optical fiber layers are formed above the baselayer 6 and the first layer 10. The baselayer 6 and the first layer 10 abut lips 12, 14 on bobbin 4. A close up view of one end of the bobbin 4 at lip 12 is shown in FIG. 1B.

Several problems are caused by winding the optical fibers over a wire base layer as is common in the prior art. First, we have noticed that a marked attenuation of the transmissivity of the optical fiber occurs in the first layer wound over the wire baselayer. It is our belief that such increased losses result from higher stresses, or microbends in the optical fibers in the first layer. A stylized illustration showing the relative losses in the wound fiber item 8 except for the first layer and in the first layer itself is shown in FIG. 1C. In order to appreciate the nature of this attenuation problem, it should be noted that typical wound optical fiber items for long payout applications may have up to 21 layers with 500 meters of optical fiber per layer. Commonly used optical fibers have a characteristic loss of ½ db per kilometer in the wound layers, excluding the first layer. However, the first layer may have up to 1 db of loss when wound over a wire baselayer at laboratory temperatures, and this first layer loss increases further at cold temperatures (e.g., at $-25°$ F. by a factor of 10). To compensate for such attenuation, either the total fiber length must be decreased or the optical input power must be increased. In applications where total packaging and system weight and size are of concern, such increased attenuation requires a tradeoff with other system components, such as the power supply, light source (i.e., a laser), or component life.

Another disadvantage to the use of a wire base-layer is that the wire used for the baselayer is expensive. Since the baselayer wire is used to control the winding pitch and other characteristics of the final wound fiber item, the wire must be fabricated to tight tolerances, requires the use of special fabrication equipment, must be stocked, and must be inspected.

One third problem with the use of a wire base-layer is that the thermal expansion properties of the baselayer wire differs markedly from the properties of the optical fiber. Thus, there is an increased possibility that the wound fiber will slip off the metal baselayer where the wound fiber is paid out at temperatures significantly different than the winding temperature.

A fourth problem is that the winding of the basewire adds extra set to the manufacturing of the wound filament, thereby increasing cost.

SUMMARY OF THE INVENTION

The invention is a compliant material that is used as a baselayer for underlying layers of an optical fiber wound onto a bobbin. In one embodiment the base-layer is selected for compatibility with an optical fiber coating. In another embodiment, the compliant material comprises a coating disposed on the bobbin. In another embodiment, the base layer comprises a silicon material.

The use of a compliant material as a baselayer eliminates the need to fabricate and stock expensive baselayer wire material. Use of the compliant material is also believed to reduce the stresses in the first wound fiber layer. In addition, it is easier to match the thermal properties of the optical fiber with the thermal properties of the compliant material over a wide temperature range than it is to match the thermal properties of the optical fiber to the baselayer wire. Thus, over an anticipated operating temperature range, the difference in thermal expansion characteristics between the base layer and the wound fiber are reduced, thereby minimizing the risk that the fiber pack will slip off the bobbin during long storage or payout.

DETAILED DESCRIPTION

The terms "wound fiber item" and "fiber pack" are used interchangably in this application. In addition, the term "compliant material" refers to any semirigid elastic material in the nature of a cushion.

Figure 1A:
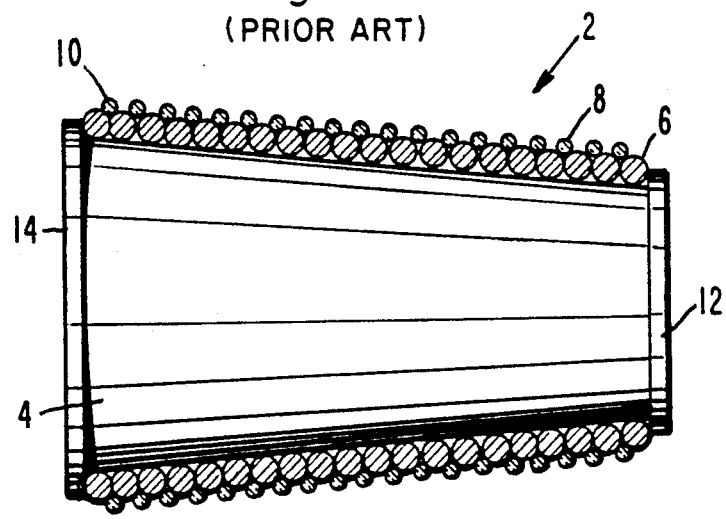
FIGS. 1A and 1B are stylized illustrations showing optical fibers wound over a wire base layer according to the prior art.
Figure 1B:
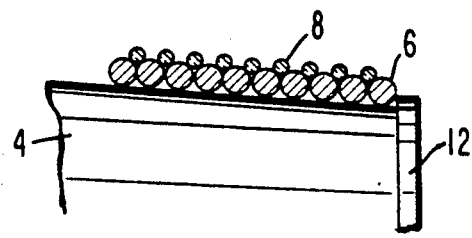
Figure 1C:
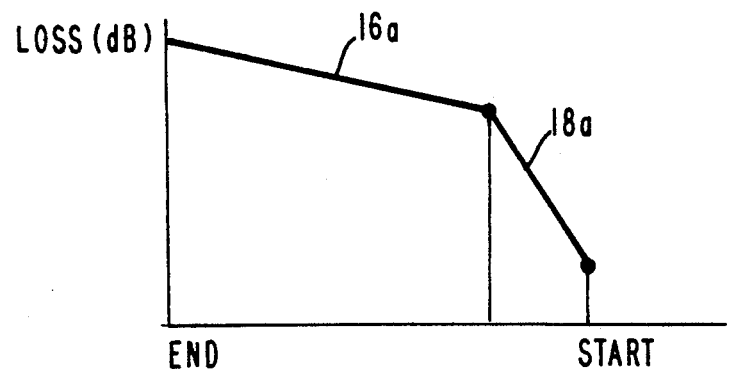
FIG. 1C is a stylized illustration showing the attenuation characteristics of a fiber pack wound according to the prior art.

The prior art techniques for winding optical fibers over wire base layers was set forth with particularity in the background. These techniques have been briefly illustrated in FIGS. 1A and 1B. The attenuation characteristic for fiber packs wound according to the use of prior art wire baselayers, is illustrated in FIG. 1C.

The invention will now be explained by reference to FIGS. 2A and 2B which illustrate a first optical fiber layer wound over a compliant material base layer according to the invention. The invention will be further explained by reference to the attenuation characteristics of a fiber pack wound according to the invention as shown in FIG. 2C.

Figure 2A:
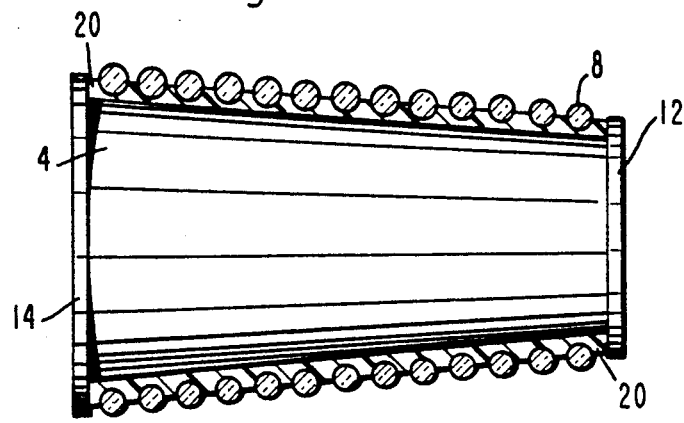
FIGS. 2A and 2B depict optical fibers wound over a base layer according to the invention.

Referring now to FIG. 2A, a wound fiber item or fiber pack 2 is shown therein. The fiber pack 2 is made by winding (optical fibers 8) over a bobbin 4. However, rather than using a wire baselayer as in the prior art, according to the invention, a baselayer is formed from a compliant material 20. In the embodiment shown in FIG. 2A, the compliant material is disposed on the bobbin 4. The process for depositing or adhering compliant baselayer 20 onto the bobbin 4, shall be explained in further detail hereafter.

Once compliant material 20 is suitably disposed on bobbin 4, a first optical fiber layer 8 is then wound over compliant base layer 20. Successive optical fiber layers (not shown) are then wound over the first optical fiber layer 8 to completely form the final wound fiber pack. A close up view showing the first layer 8 nested in the compliant baselayer 20 is shown in FIG. 2B.

Figure 2B:
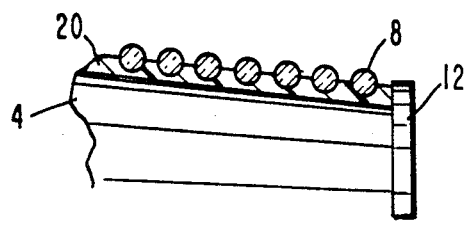
Figure 2C:
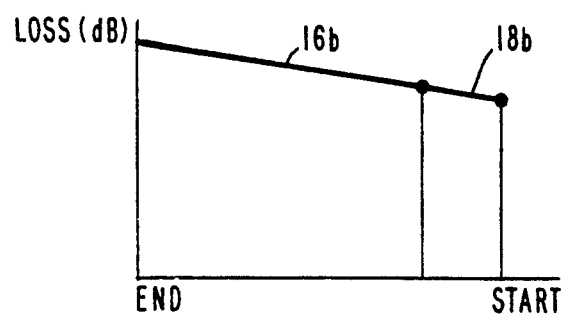
FIG. 2C is a stylized illustration showing the attenuation characteristics of a fiber pack wound according to the invention.

We have observed that the final wound fiber pack according to the invention has characteristics as shown in FIG. 2C. As shown therein, the attenuation curve for the wound fiber pack no longer drops off markedly in the first wound layer.

One method for forming a base layer of compliant material on a bobbin will now be described. It should be understood, however, that other methods for depositing or otherwise forming compliant material on a bobbin will become readily apparent to one skilled in the art in view of this disclosure. Thus the following description is merely illustrative and should not be considered limiting of the invention.

To make a bobbin having a compliant baselayer according to the invention, first a bobbin is provided. A typical bobbin may be made of aluminum.

Next, a suitable compliant material may be formed by mixing silicon based material with a suitable solvent. We have found that Dow Corning 3140 provides a suitable silicon material. We have also found that toluene provides a suitable solvent. The solvent is added to control viscosity and to provide the necessary degree of compliance for the Dow 3140 silicon. The silicon and toluene is mixed in a ratio of 2 to 3 by weight.

Once a proper mixture of solvent and base compliant material mix is formed, the bobbin may then be dipped into the mix to form a thin coating over the bobbin surface. The dipped bobbin is then permitted to drip dry. We have found that a final thickness for the compliant mix of approximately 0.006 inches provides a satisfactory baselayer. The previously mentioned mix of Dow 3140 and toluene will provide this thickness.

The coating on the bobbin must be permitted to cure. We have found that our mix of Dow 3140 and trichloroethylene requires several days to finally cure and drip dry to the desired thickness of 0.006 inches. Care must be taken that the compliant material is not too thick or otherwise the base layer may become unstable and be subject to slippage. Thus, the baselayer must be easy to apply, capable of being applied evenly, rigid enough to hold the pack in place.

Refer now to FIG. 2B. As shown in FIG. 2B, each optical fiber 8 in the first fiber layer 10 deforms into an oval shape when wound into the compliant base layer 20. The optical fiber 8 exhibits Hertzian behavior and gives the spacing desired. The interstitiary spaces 22 between optical fibers 8 in FIG. 2B are approximately 2 to 3% of the fiber diameter. This provides a suitable spacing. We have found that a total thickness of the compliant baselayer of between 0.002 and 0.006 inches provides satisfactory results.

Other parameters that should be considered in selecting a desirable baselayer material and solvent include the winding tension, the size of the optical fiber, and the compatibility of the base layer material with the fiber coating. The baselayer material should be compatible with the coefficient of thermal expansion (CTE) of the fiber buffer and the bobbin. It also needs to be chemically stable so as to not react with the buffer. The modulus of the baselayer material is important—particularly over time to give the necessary fiberpack stability. Coupled with the modulus are the adhesive properties of the baselayer material to the bobbin and the buffer. We have achieved satisfactory results with the Dow 3140 mix when applying a winding tension of 115 grams for optical fibers of approximately 0.010 inches of diameter. We have also found that the optical fibers nest into the compliant material approximately 30% of the fiber diameter for our silicontrichloroethylene mix, at the winding tension of 115 grams.

Although the invention has been explained by reference to the foregoing figures and processes, it should be understood that the examples given herein are merely illustrative and that changes and variations can be made by one skilled in the art without departing from the scope and spirit of the invention. For example, the compliant material can be an elastic sleeve or jacket that fits snugly onto thebobbin, with the sleeve or jacket being preformed with predetermined pitch characteristics for determining the winding characteristics of the final wound item. As another example, the compliant material may be a gel like substance that is applied using a roller or squeegie type device. The gel is then cured to the desired compliance. Thus, it should be understood that the invention is to be limited only in accordance with the appending claims.

I claim:

1. In a system for winding layers of an optical fiber onto a bobbin, said system having a baselayer disposed on said bobbin and a plurality of optical fiber layers wound over said baselayer, an improved baselayer having a thickness between 0.002 and 0.006 inch and comprising a compliant material composed of a mixture of substantially two parts by weight of a silicon material and three parts by weight of toluene.

2. The system of claim 1 and wherein said compliant material is a coating which has been applied to said bobbin.

3. The system of claim 1 and wherein said compliant material comprises a jacket or sleeve for said bobbin.

* * * * *